J. R. BOUTELL.
ANTISCALD FAUCET.
APPLICATION FILED MAY 28, 1912.
1,061,975.
Patented May 20, 1913.
2 SHEETS—SHEET 1.
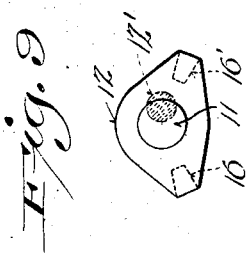
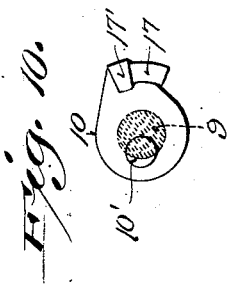
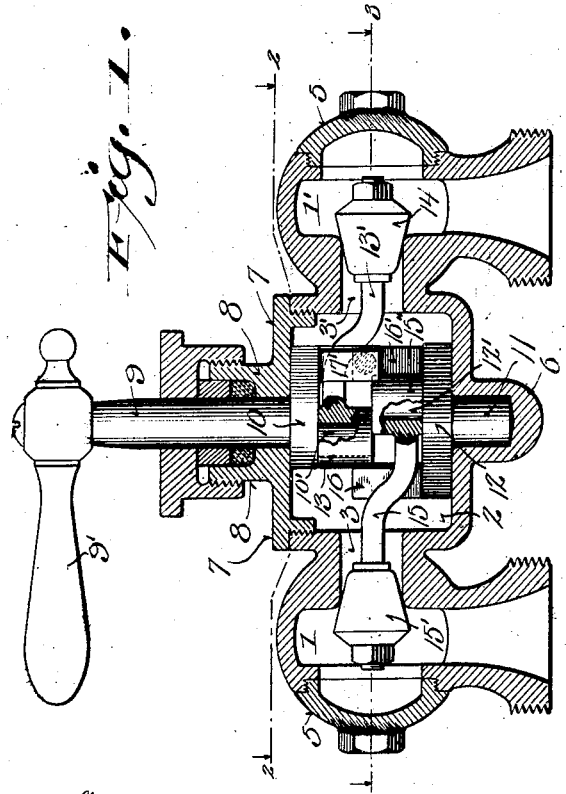
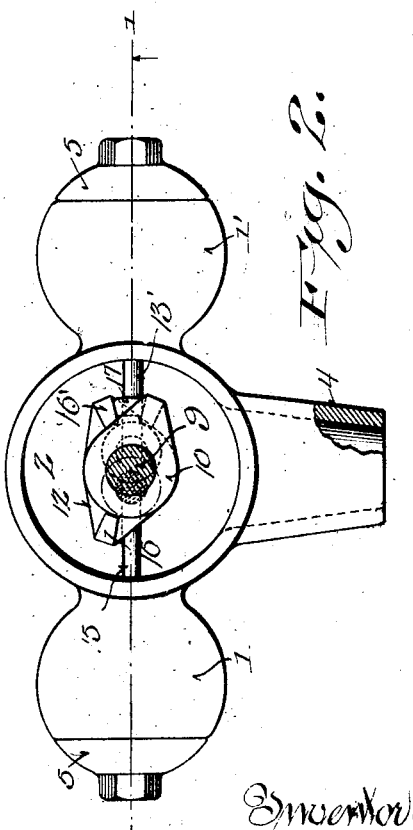

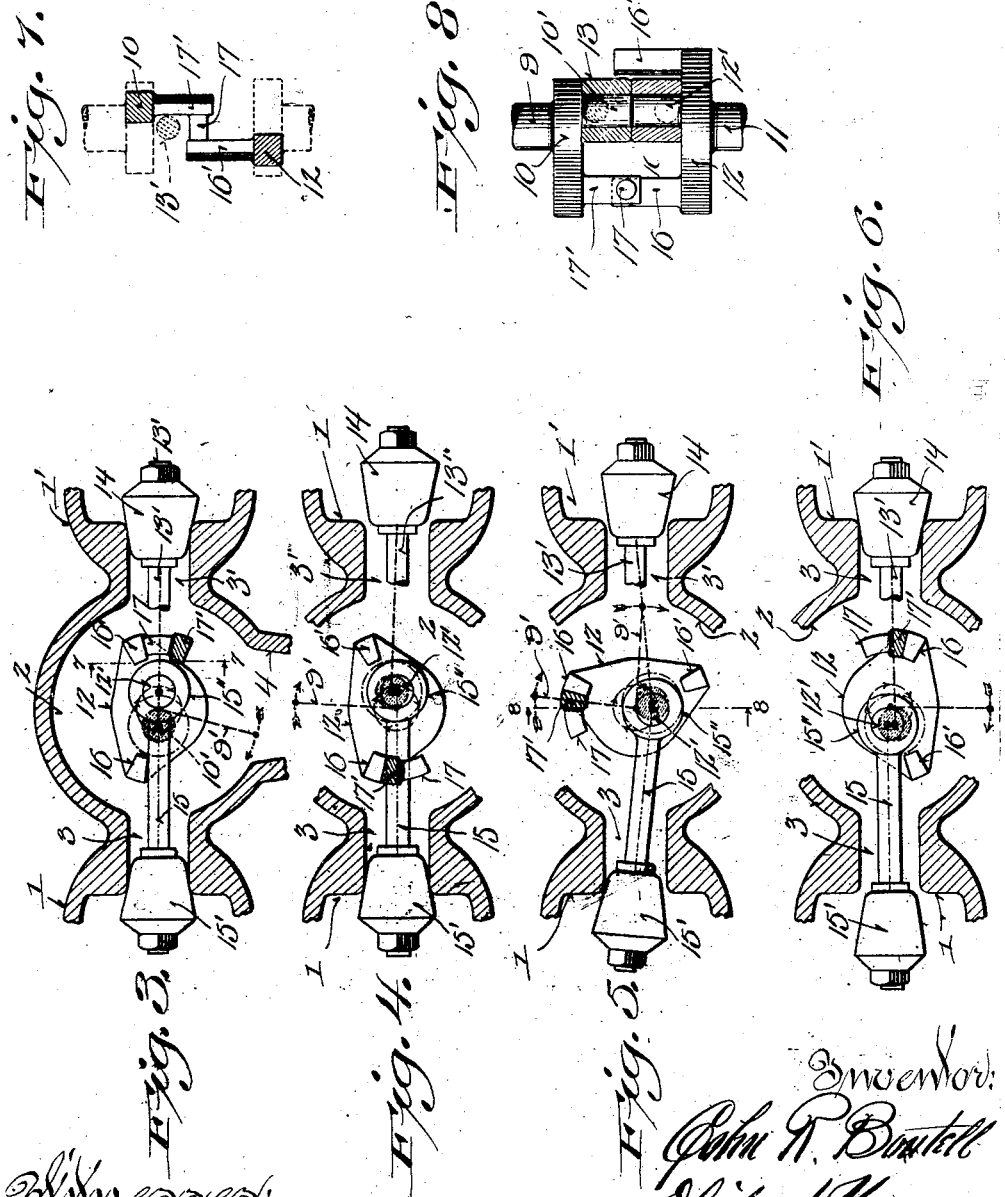

UNITED STATES PATENT OFFICE.

JOHN R. BOUTELL, OF MILWAUKEE, WISCONSIN, ASSIGNOR OF ONE-HALF TO SIEBERS & RAISCH PATTERN WORKS, OF MILWAUKEE, WISCONSIN.

ANTISCALD-FAUCET.

1,061,975.   Specification of Letters Patent.   Patented May 20, 1913.

Application filed May 28, 1912. Serial No. 700,210.

*To all whom it may concern:*

Be it known that I, JOHN R. BOUTELL, a citizen of the United States, and resident of Milwaukee, in the county of Milwaukee and State of Wisconsin, have invented certain new and useful Improvements in Antiscald-Faucets; and I do hereby declare that the following is a full, clear, and exact description thereof.

My invention refers to what is known to the trade as an antiscald faucet, its object being to provide a simple, economical, effective and positively actuated compound faucet of the aforesaid type.

In carrying out my invention I provide a housing with separate hot and cold water supply ports that communicate with a common mixing chamber within the housing, the mixing chamber having a single discharge mouth. The supply ports are controlled by independent valves that are actuated by independent eccentrics, one of which is carried by an operating spindle that is arranged concentric with a stud spindle, which stud spindle carries the opposite eccentric. Motion is imparted to the stud spindle from the operating spindle by a tappet finger carried by said operating spindle, which tappet finger alternately engages spaced actuating lugs that project from the stud spindle, the actuating lugs constituting tappet opposing shoulders. By this assemblage of mechanical elements it is apparent that an approximate revolution of the operating spindle in one direction will in its cycle successively first open the cold water port followed by half opening the hot-water port coincident with a half closure of said cold water port and in completing its cycle the hot water port will be fully opened, while the cold water port is simultaneously fully closed, the operation being reversed upon return of the spindle to its normal or closed position. Thus it is apparent that scalding is prevented owing to the fact that a full stream of cold water will flow through the mixing chamber, followed by an equal flow of mixed hot and cold water and thereafter at the discretion of the operator the cycle may be completed whereby the cold water is entirely cut off or the temperature of the mixture may be increased to any desired degree, up to a maximum degree consistent with the temperature of the hot water.

With the above objects in view the invention consists in certain peculiarities of construction and combination of mechanical elements as hereinafter set forth with reference to the accompanying drawings and subsequently claimed.

In the drawings Figure 1 represents a longitudinal central sectional elevation of a faucet embodying the features of my invention; Fig. 2, a plan view partly in section as indicated by line 2—2 of Fig. 1; Figs. 3 to 6 inclusive illustrate sectional diagram views showing the various positions assumed by the valves in a complete cycle; Fig. 7, a detailed cross-section of the valve-actuating mechanism, the section being indicated by line 7—7 of Fig. 3; Fig. 8, a similar detailed sectional view of the valve actuating mechanism, the section being indicated by line 8—8 of Fig. 5; Fig. 9 represents a detailed face view of one of the valve-actuating members, and Fig. 10, an inverted face view of the opposite valve-member.

Referring by characters to the drawings, 1, 1' represent hot and cold water chambers respectively of a housing, which housing is provided with a centrally disposed mixing chamber 2 that communicates with the valve chambers through hot and cold water ports 3, 3' respectively, the mixing chamber being also provided with a discharge port 4 that is adapted to receive a suitable spigot fitting. The valve chambers are each provided with opened ends which are closed by caps 5 in threaded union with said open ends. The bottom wall of the mixing chamber is provided with a projecting centrally disposed socket 6, while the upper wall of said chamber is provided with an open mouth to facilitate assemblage of the mechanism, which mouth is closed by a bonnet 7 that is in screw-threaded engagement therewith, the bonnet being provided with a stuffing-box 8 for the reception of an operating spindle 9, which spindle projects through said stuffing box and carries an actuating handle 9'. The lower end of the operating spindle is provided with a head 10 which extends into the mixing chamber and carries a depending eccentric-pin 10'. A stud spindle 11 is journaled in the socket 6 in alinement with the operating spindle, the said stud spindle being provided with a head 12 that carries an eccentric pin 12'. The spindles, heads and eccentric pins just described thus constitute actuating eccentrics for valve-members of the Fuller type, which valve-members will be hereinafter more fully described. For the purpose of convenience in assemblage, as best shown in Fig. 1, the opposite flat end faces of the eccentrics are upon approximately the same horizontal plane, a line drawn through which plane intersects the center of the supply ports, there being just sufficient clearance between the end faces of the eccentrics to permit independent rotation thereof.

An apertured hub 13 of a valve-stem 13' is journaled upon the operating stem eccentric 10', the valve-stem being bent in ogee form so as to bring its free end in alinement with the cold water supply port 3'. The free end of said stem carries a ball-valve 14, which ball-valve is adapted to close the port and open the same in opposition to water pressure. A similar valve-stem 15 carrying a ball-valve 15' is fitted to the stud spindle eccentric 12', the said stem being provided with an apertured hub 15'' that is adapted to receive the eccentric. The hot-water valve-stem is a duplicate of the cold water valve-stem, with the exception that it is bent in an ogee form opposite that of said cold water stem, the bend in either stem being made to effect a clearance incidental to the rotation of the eccentrics. It will also be observed that owing to the fact that the end faces of both eccentrics are practically upon the same plane that the end face of the stud eccentric 12' and apertured hub of the valve-stem 15 will serve as a rub-plate for the apertured hub 13 of the cold water valve-stem 13', whereby said cold water valve-stem is held in its relative correct position.

When the hot water valve is closed as best shown in the diagram view Fig. 3, the same is locked in this position by a lug 16 which projects upwardly from the stud spindle head 12, the said lug being in engagement with the valve-stem 15 whereby further movement of the stud spindle from left to right is checked and in this checked or locked position, as shown in said diagram view, the handle 9' will assume the position indicated in dotted lines. Another lug 16' projects upwardly from the head 12 and when the valve is in its normal or closed position the said lug, as shown in the diagram view Fig. 3, is engaged by a horizontally disposed offset shoe 17 that forms part of a tappet 17', which tappet depends from the head 10 of the operating stem, the said shoe being positioned to pass under the offset portion of the cold water valve-stem 13'. Thus it is apparent that when the handle 9' as indicated in dotted lines Fig. 3, is in its normal or closed position, that the tappet shoe being in engagement with the lug 16', will lock said handle in this position, owing to the head 12 being held against further rotation from right to left by the lug 16 hereinbefore mentioned, in which position the cold water valve also forms a tight closure for the cold water port 3'. The lugs 16 and 16' constitute tappet opposing members or shoulders which are adapted to be actuated by the operating spindle tappet. The lug 16' serves as a closing member for the hot water valve when engaged by the tappet and the lug 16 serves as an opening member for said hot-water valve when engaged by the aforesaid tappet and also a locking member for the valve when said lug 16 is opposed by the valve stem 15. It will also be apparent from the drawings that when the operating stem is rotated from left to right to open the valves that the tappet 17' carried thereby is of such length to permit it to travel over and pass the offset hot-water valve-stem 15 whereby in its rotation the tappet will pick up lug 16 and through its connections cause rotation of the stud spindle.

As previously stated both the operating and stud spindles are journaled in the housing in axial alinement and by referring to the diagram view Fig. 3, it will be seen that when both valves are closed and the operating handle is in its normal position, the hot-water valve eccentric 12' and the cold water valve eccentric 10' are at points of their greatest throw relative to inward movement of their respective valves, thus drawing said valves tightly against their seats. Hence to open the cold water valve, the handle 9' is first given an approximate half turn, the same assuming the position as shown in the diagram view Fig. 4, said handle being moved from left to right. In describing this portion of a revolution the operating eccentric 10' of the cold water valve will describe an approximate half revolution whereby the full outward thrust of the cold water valve stem 13' will be effected, thus causing said valve to open the cold water port to its full capacity. While this movement is being effected there will be no movement of the hot water valve-controlling mechanism but simultaneously with the full opening of the cold water valve the tappet 17' will have engaged lug 16 that projects from the head of the stud spindle as shown in Fig. 4. Should the valve-stem be given an approximate quarter turn in the same opening direction it will assume the position shown in Fig. 5, and hence in this partial rotation of the operating stem the tappet 17' will have caused a quarter rotation of the stud spindle head, which rotation will cause the hot water eccentric 12' to move toward the hot water port approximately half of its throw. Hence said hot water valve will be thrust from its seat a sufficient distance to permit half the capacity of the full flow of hot water through said port to the mixing chamber. Incidental to this initial movement of the hot water valve the cold water eccentric 10' will have moved to approximately the same point as the hot water eccentric and thus the cold water valve will be drawn toward its seat whereby the flow of the cold water to the mixing chamber will have been reduced to one-half of its capacity. Hence in the position shown in Fig. 5 hot and cold water will be admitted to the mixing chamber in equal quantities, which mixture will be discharged through the chamber mouth 4. Should it be desired to increase the temperature of the flowing water, the handle 9' will be moved from right to left either an approximate quarter throw or any part thereof whereby the hot and cold water eccentrics will travel together to the position shown in Fig. 6, in which position the handle has completed its cycle and the cold water eccentric is in approximately the same position as that shown in the diagram view Fig. 3, whereby the cold water port is closed by its valve member and the hot water port is full open.

It is apparent that if desired the handle 9' can be set in any intermediate position between the positions shown in Figs. 5 and 6 to temper the water at any degree above the temperature produced by a mixture of equal parts of hot and cold. Should it be desired to close the valve it is apparent that rotation of the operating handle is reversed and both valves are finally brought to a closed position as indicated in the diagram view Fig. 3 and in returning to said normal position the progressive movement of the valves will be successively obtained in the reverse from that just described, the tappet shoe 17 picking up lug 16' in its rotation, whereby the stud spindle is rotated back to its normal locked position.

From the foregoing description it is apparent that by a simple handle movement a full flow of cold water is first admitted to the chamber and thereafter the cold water flow is partially restricted and an equal portion of hot water is admitted to said mixing chamber so that the danger of scalding through inadvertent quick manipulation of the operating means of a combination hot and cold water valve is eliminated. It is also apparent that the bonnet 7 may be provided with suitable indication marks to show the successive required movements of the valve handle in order to produce the desired temperature of water. Attention is also called to the fact that while I have shown and described the valves as of the Fuller type that I may, without departing from the spirit of my invention employ any suitable form of valve in conjunction with the independent eccentrics and tappet mechanism.

I claim:

1. A faucet comprising a housing having a mixing chamber provided with a pair of supply ports and a discharge port, a valve for each supply port, independent actuating eccentrics connected to the respective valves, a tappet carried by one of the eccentrics, a pair of tappet opposing members carried by the other eccentric adapted to be engaged by the tappet, and an operating spindle for one of said eccentrics.

2. A faucet comprising a housing having a mixing chamber provided with a pair of supply ports and a discharge port, a valve for each supply port, independent actuating eccentrics connected to the respective valves, a tappet carried by one of the eccentrics, a pair of tappet opposing lugs projecting from the other eccentric in the path of travel of the tappet, and an operating spindle for the tappet-carrying eccentric.

3. A faucet comprising a housing for a mixing chamber provided with a pair of supply ports and a discharge port, a ball valve for each supply port, stems extending inwardly from said ball-valves, the stems being provided with apertured hubs, an operating spindle journaled in the housing, a stud spindle journaled in the housing in axial alinement with the operating spindle, but independent therefrom, a head carried by each spindle, a pin extending from each head eccentric to its spindle, the pins being in engagement with the stem hubs, a tappet extending from one of the heads, and lugs extending from the opposite head arranged to be alternately engaged by the tappet.

4. A faucet comprising a housing having a mixing chamber provided with a pair of supply ports and a discharge port, a valve for each supply port, a headed operating spindle journaled in the housing, a headed stud spindle journaled in said housing in axial alinement with the operating spindle, an eccentric carried by each spindle head, stems connecting the valves with the respective eccentrics, a tappet extending from the operating spindle head, and a pair of lugs extending from the stud spindle head adapted to be engaged by the tappet, one of the lugs being adapted to engage one of said valve stems to effect a locking movement of its valve member when the latter is closed.

In testimony that I claim the foregoing I have hereunto set my hand at Milwaukee in the county of Milwaukee and State of Wisconsin in the presence of two witnesses.

JOHN R. BOUTELL.

Witnesses:
Geo. W. Young,
W. A. Raisch.